(12) United States Patent
Zhang

(10) Patent No.: US 6,820,440 B2
(45) Date of Patent: Nov. 23, 2004

(54) ABSORPTION-TYPE AIR CONDITIONER CORE STRUCTURE

(76) Inventor: Yue Zhang, Broad Town, Changsha (CN), 410138

( * ) Notice: Subject to any disclaimer, the term of this patent is extended or adjusted under 35 U.S.C. 154(b) by 0 days.

(21) Appl. No.: 10/794,464

(22) Filed: Mar. 6, 2004

(65) Prior Publication Data

US 2004/0177645 A1 Sep. 16, 2004

(30) Foreign Application Priority Data

Mar. 11, 2003 (CN) .......................................... 03118157 A

(51) Int. Cl.[7] .............................................. F25B 15/00
(52) U.S. Cl. .............................. 62/476; 62/481; 62/497; 165/184; 165/179; 165/163
(58) Field of Search .......................... 62/476, 481, 485, 62/495, 497; 165/184, 179, 163

(56) References Cited

U.S. PATENT DOCUMENTS 3,323,323 A * 6/1967 Phillips ........................ 62/497
3,407,625 A * 10/1968 McDonald .................... 62/476
3,509,732 A * 5/1970 Roeder ......................... 62/476
3,828,575 A * 8/1974 Malcosky et al. ............ 62/476
4,106,309 A * 8/1978 Phillips ........................ 62/476

* cited by examiner

Primary Examiner—Melvin Jones
(74) Attorney, Agent, or Firm—Yi Li

(57) ABSTRACT

An absorption-type air conditioner core structure is provided, which uses lithium bromide solution as absorbent and has a small volume and compact structure. The air conditioner core structure includes an upper vessel (24) and a lower vessel (21). The upper vessel and lower vessel are connected by a refrigerant water pipe (22), a cooling water pipe (7), a heating steam pipe (5), two concentrate solution pipes (27, 58) and two dilute solution pipes (46, 52). The concentrate solution and dilute solution pipes are disposed within a solution pipe protecting cover (23) which connects to both vessels. Because of its compact structure, small volume, fewer welding seams, high level of vacuum, and having the heat exchange pipes (30, 39, 61, 73) of the condenser 1, low temperature generator 2, evaporator 10 and absorber 11 all made of helical copper pipes, the air conditioner core structure has high heat exchange efficiency.

7 Claims, 10 Drawing Sheets

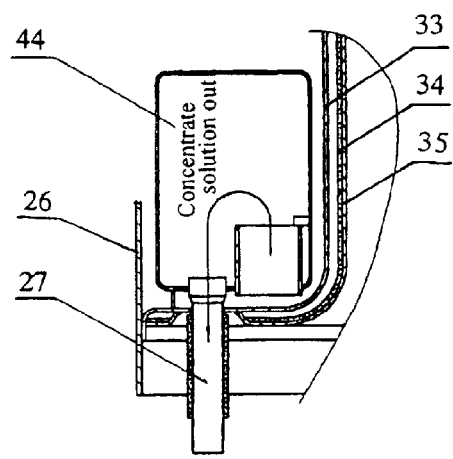
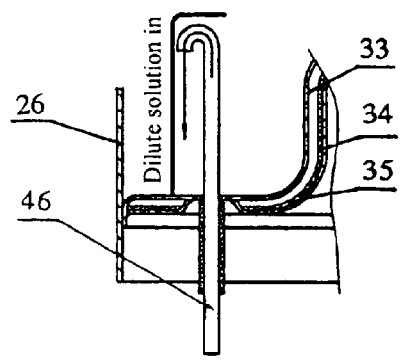
Figure 6
Figure 7
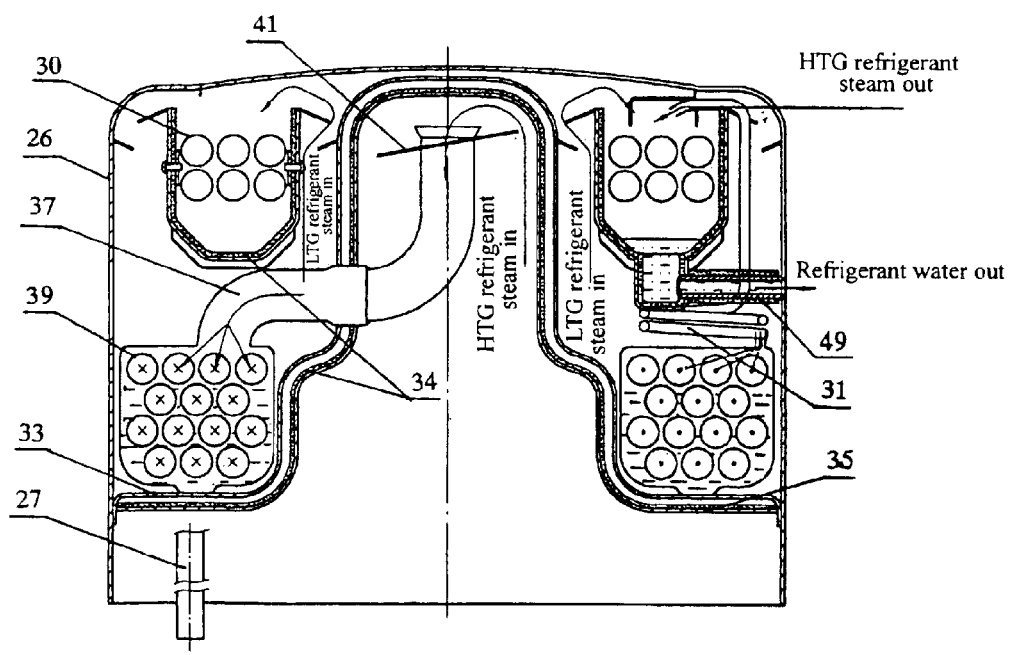
Figure 8

ABSORPTION-TYPE AIR CONDITIONER CORE STRUCTURE

CROSS REFERENCE TO RELATED APPLICATION

This application claims priority of Chinese patent application No. 03118157.0 filed Mar. 11, 2003, which is herein incorporated by reference in its entirety.

FIELD OF TECHNOLOGY

The present invention is related to one type of air conditioner with lithium bromide solution as absorbent and with water as refrigerant. More specifically, the present invention is related to an absorption-type air conditioner core structure that has a small volume and a compact structure.

TECHNICAL BACKGROUND

The high temperature generator of the traditional absorption air conditioner is in an independent vessel, and the low temperature generator and the condenser are in one vessel, the evaporator and absorber are in another vessel, and the high temperature and low temperature heat exchangers are outside of these vessels. Consequently, there are many welding seams on these vessels, the probability of outward leakage is high, vacuum level is relatively low and heat loss is also relatively high.

SUMMARY OF THE INVENTION

The objective of the present invention is to provide one type of absorption air conditioner core structure that has a very compact structure, relatively fewer external welding seams, better vacuum condition and less heat loss.

The design scheme of the present invention is as follows: the air conditioner core structure is mainly composed of an upper vessel and a lower vessel, the upper vessel and the lower vessel being connected by a refrigerant water pipe, a cooling water pipe, a heating steam pipe, two concentrated solution pipes and two dilute solution pipes. The two concentrate solution pipes and the two dilute solution pipes are disposed within a solution pipe protecting cover, and the solution pipe protecting cover connects to the upper vessel and the lower vessel. The upper vessel comprises a high temperature generator (hereinafter referred to as HTG), a low temperature generator (hereinafter referred to as LTG) and a condenser. The high temperature generator and the low temperature generator are separated by the separating plates I and II of the HTG and LTG. The low temperature generator is above the high temperature generator, and the condenser is above the low temperature generator. There are non-metal insulation boards between the high temperature generator and the low temperature generator and between the low temperature generator and the condenser. The lower vessel comprises a plate heat exchanger, evaporator and absorber. The plate heat exchanger is located in the upper part of the lower vessel and the evaporator and absorber are below the plate heat exchanger. The evaporator is at the middle part of the lower vessel, and the absorber surrounds the evaporator. The heat exchange pipes of the condenser, low temperature generator, evaporator and absorber are all helical copper pipes.

BRIEF DESCRIPTION OF THE DRAWINGS

The present invention is now described in details with the accompanying drawings.

FIG. 6 is the D-D cross sectional view of FIG. 5.

FIG. 7 is the E-E cross sectional view of FIG. 5.

FIG. 8 is the F-F cross sectional view of FIG. 5.

In the above described figures the numbers represent: 1—condenser, 2—LTG, 3—solution, 4—HTG, 5—heating steam pipe, 6—heating steam switch valve, 7—cooling water pipe, 8—plate heat exchanger, 9—air conditioning water pipe, 10—evaporator, 11—absorber, 12—water tray, 13—refrigerant venting valve, 14—cooling water pump, 15—air conditioning water pump, 16—filter, 17—refrigerant pump, 18—filter, 19—solution pump, 20—solution, 21—lower vessel, 22—refrigerant water pipe, 23—solution pipe protecting cover, 24—upper vessel, 25—refrigerant water, 26—shell of the LTG and condenser, 27—concentrate solution outlet pipe, 28—cooling water outlet pipe, 29—cooling water inlet pipe, 30—condenser heat exchange pipe, 31—LTG pressure differential capillary tube, 32—cooling water outlet shielding plate, 33—separating plate II of the HTG and LTG, 34—non-metal insulation board, 35—separating plate I of the HTG and LTG, 36—condensation heat exchange pipe supporting plate, 37—LTG steam inlet pipe, 38—condensation trough, 39—LTG heat exchange pipe, 40—condenser tube sheet, 41—HTG liquid guiding plate, 42—LTG tube sheet, 43—LTG rear water chamber, 44—LTG concentrate solution outlet chamber, 45—LTG partition plate, 46—dilute solution inlet pipe, 47—LTG baffle, 48—LTG front steam chamber, 49—refrigerant water outlet pipe, 50—HTG heating steam pipe, 51—equilibrium tube, 52—HTG dilute solution inlet pipe, 53—HTG concentrate solution chamber, 54—HTG shell, 55—HTG combustion chamber, 56—wavy fin, 57—HTG concentrate solution outlet pipe, 58—HTG concentrate solution inlet pipe, 59—HTG smoke pipes, 60—HTG smoke pipe tube sheet, 61—evaporator heat exchange pipe, 62—air conditioning water outlet pipe, 63—air conditioning water inlet pipe, 64—refrigerant water first time inlet pipe, 65—refrigerant water second time inlet pipe, 66—refrigerant water spraying pipe, 67—outer liquid shielding plate, 68—inner water shielding plate, 69—side liquid and water shielding plate, 70—evaporator heat exchange pipe supporting plate, 71—water tray, 72—refrigerant water, 73—absorber heat exchange pipe, 74—cooling water outlet pipe, 75—cooling water inlet pipe, 76—liquid shielding plate, 77—absorber solution spraying pipe, 78—absorber heat exchange pipe supporting plate, 79—absorber holding plate, 80—HTG concentrate solution inlet pipe, 81—LTG solution inlet pipe, 82—dilute solution pipe, 83—refrigerant water outlet pipe.

Detailed Description of the Invention

Figure 1:
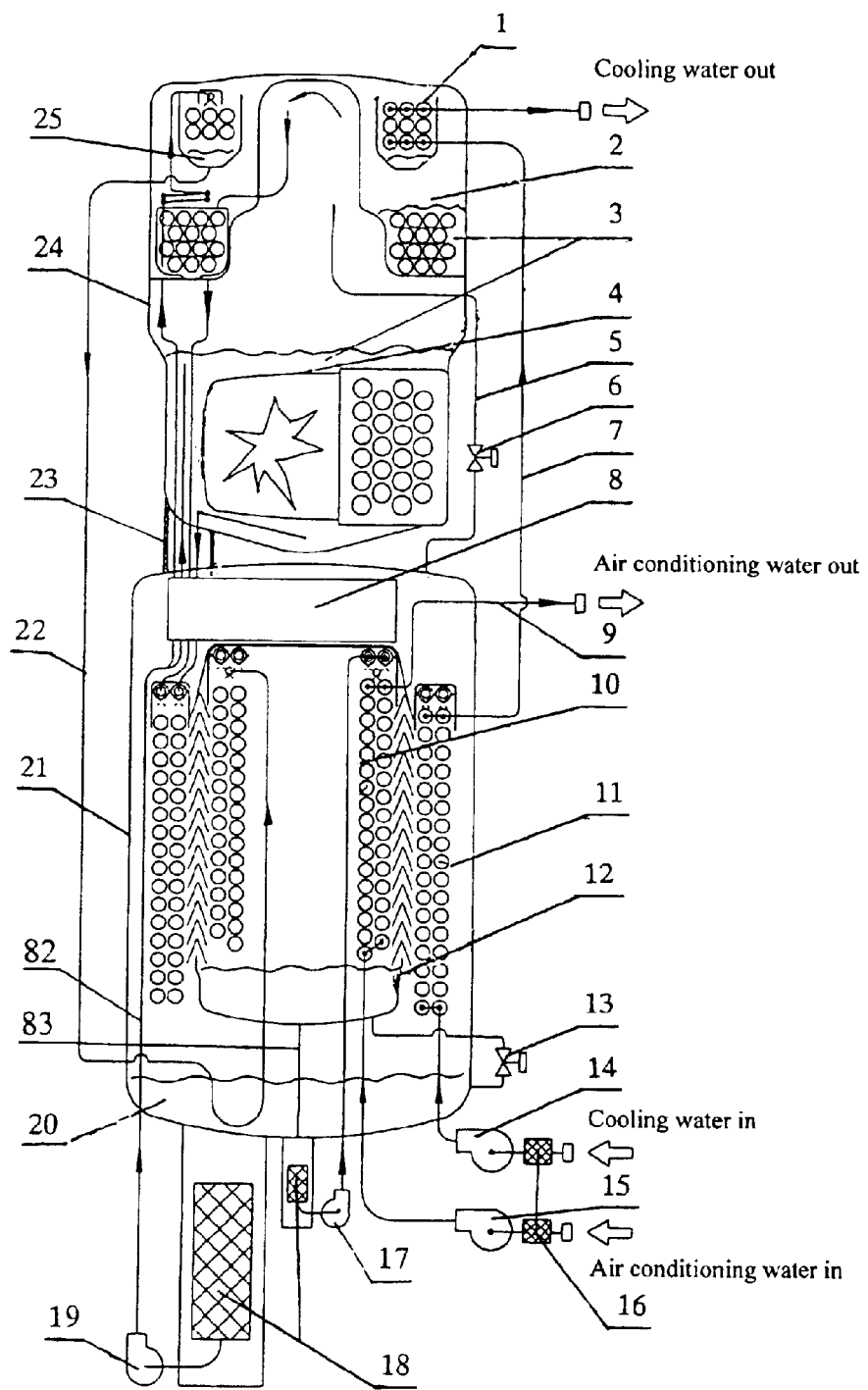
FIG. 1 is a systematic view of the present invention.
Figure 2:
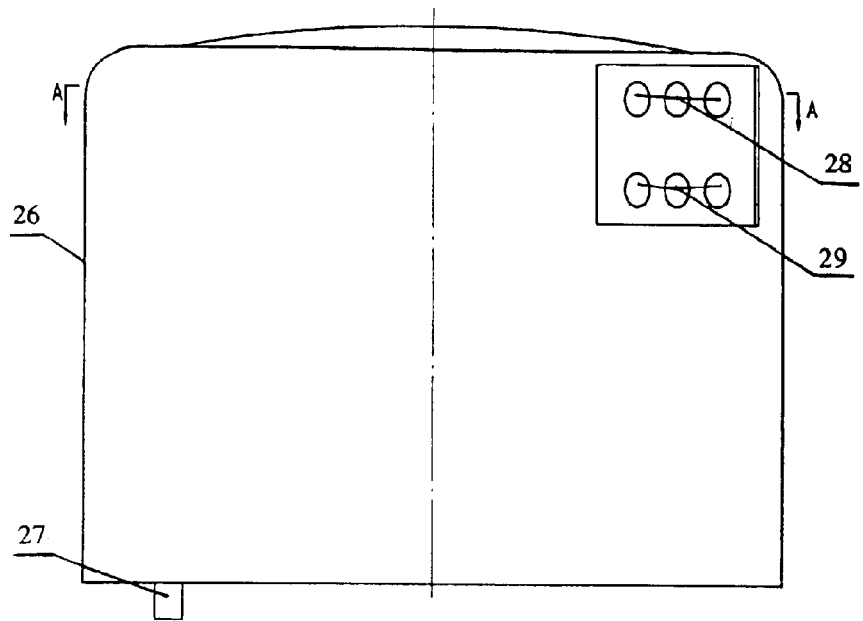
FIG. 2 is a side view of the shell of the LTG and condenser in the upper vessel of the present invention.
Figure 3:
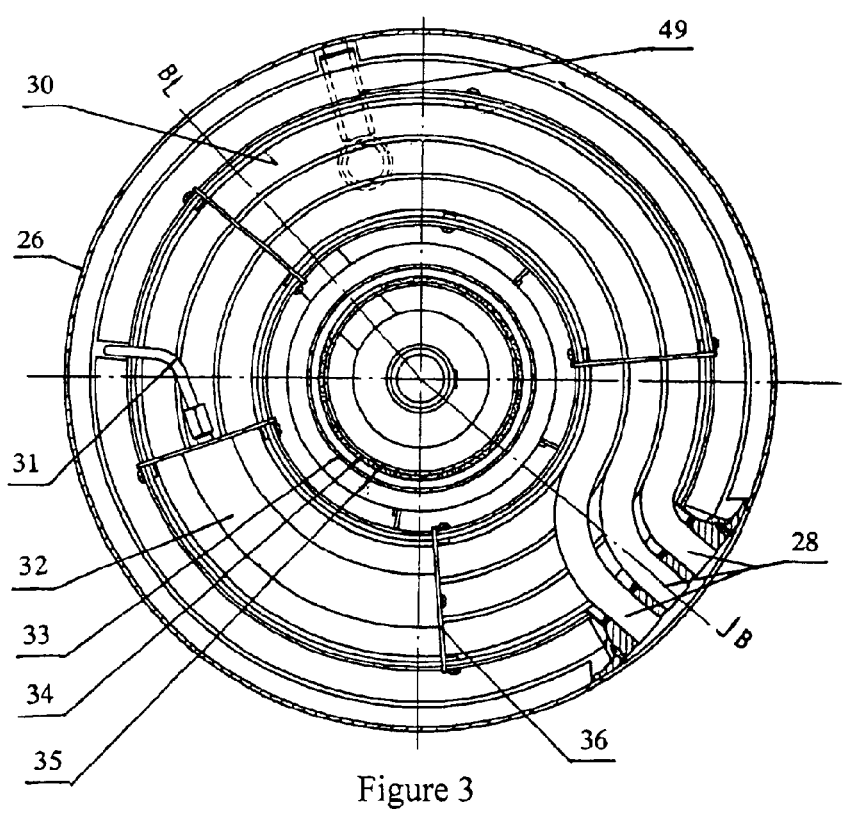
FIG. 3 is the A-A cross sectional view of FIG. 2.
Figure 4:
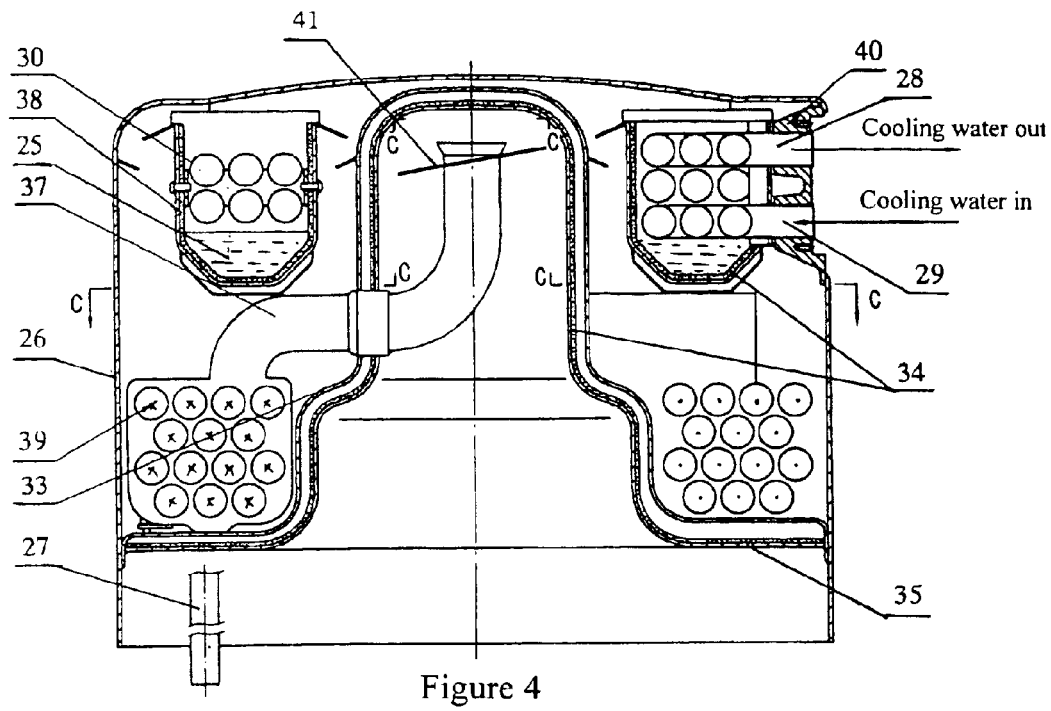
FIG. 4 is the B-B cross sectional view of FIG. 3.
Figure 5:
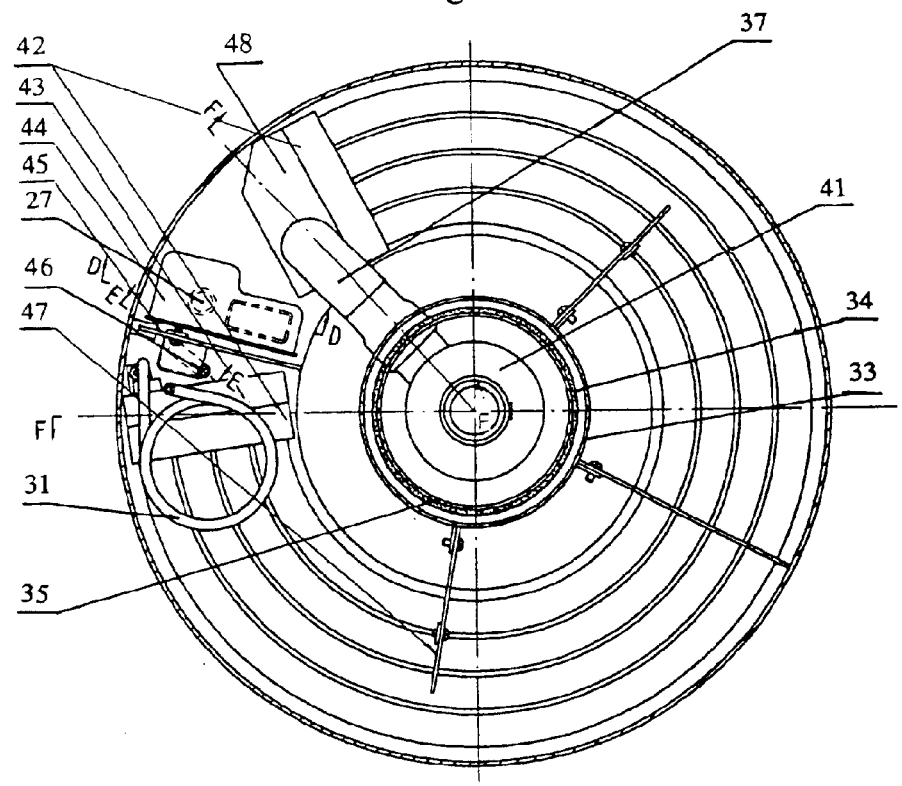
FIG. 5 is the C-C cross sectional view of FIG. 4.
Figure 9:
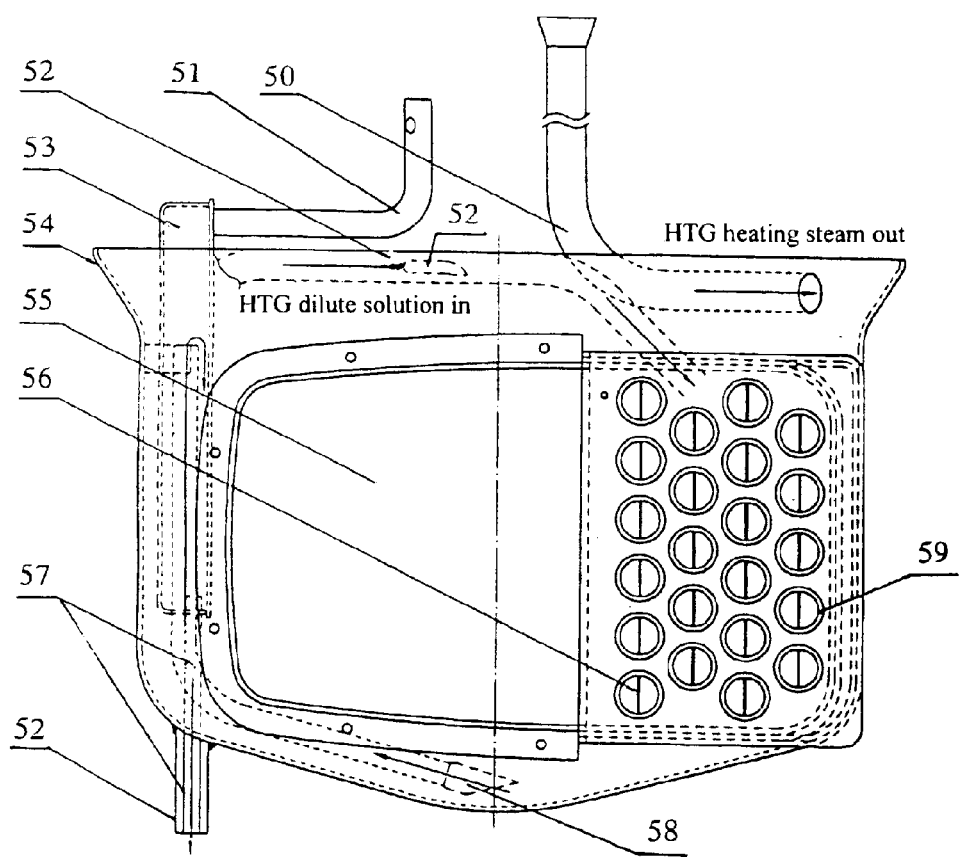
FIG. 9 is a side view of the HTG in the upper vessel of the present invention.
Figure 10:
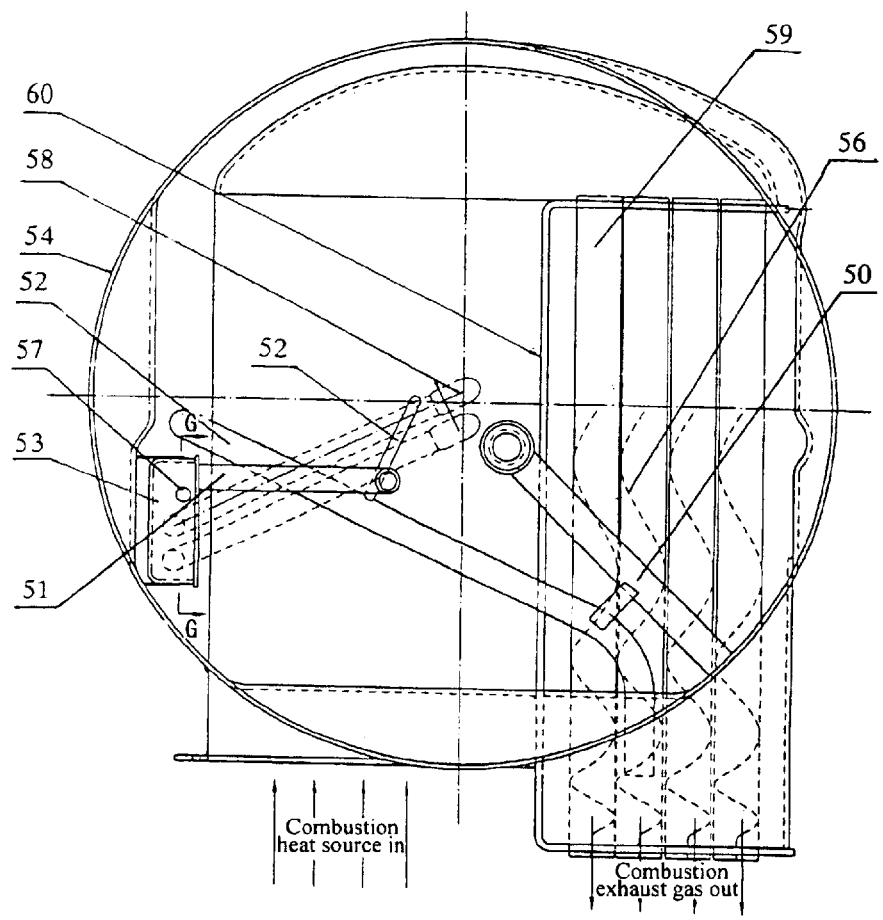
FIG. 10 is a top view of FIG. 9.
Figure 11:
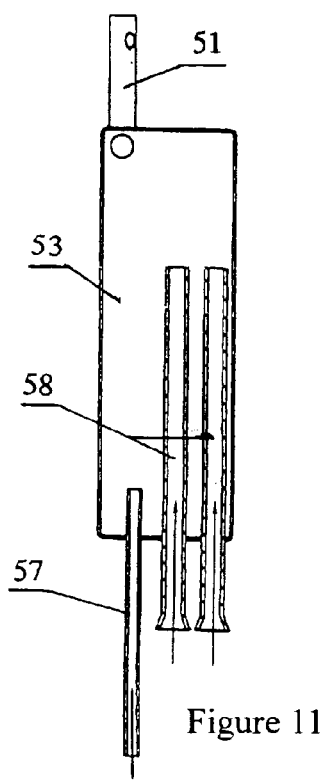
FIG. 11 is the G-G cross sectional view of FIG. 10.
Figure 12:
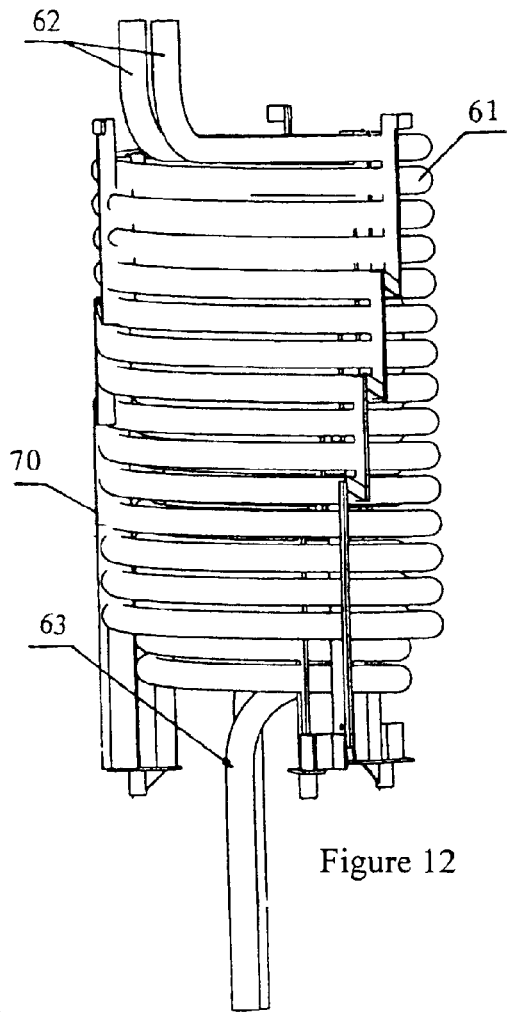
FIG. 12 is a perspective view of the evaporator heat exchange pipes in the lower vessel of the present invention.
Figure 13:
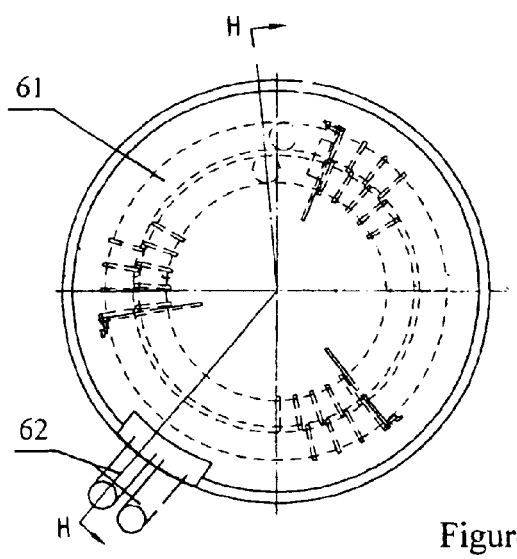
FIG. 13 is a top view of the evaporator in the lower vessel of the present invention.
Figure 15:
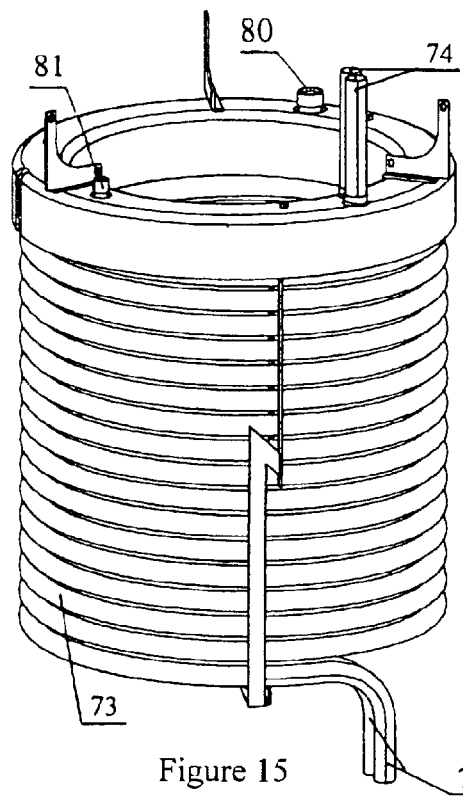
FIG. 15 is a perspective view of the absorber heat exchange pipe of the lower vessel of the present invention.
Figure 16:
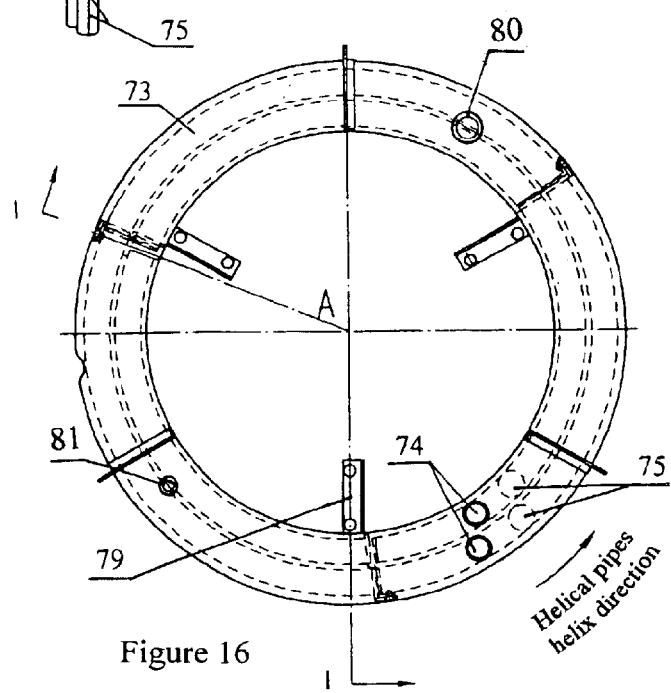
FIG. 16 is a top view of FIG. 15.
Figure 17:
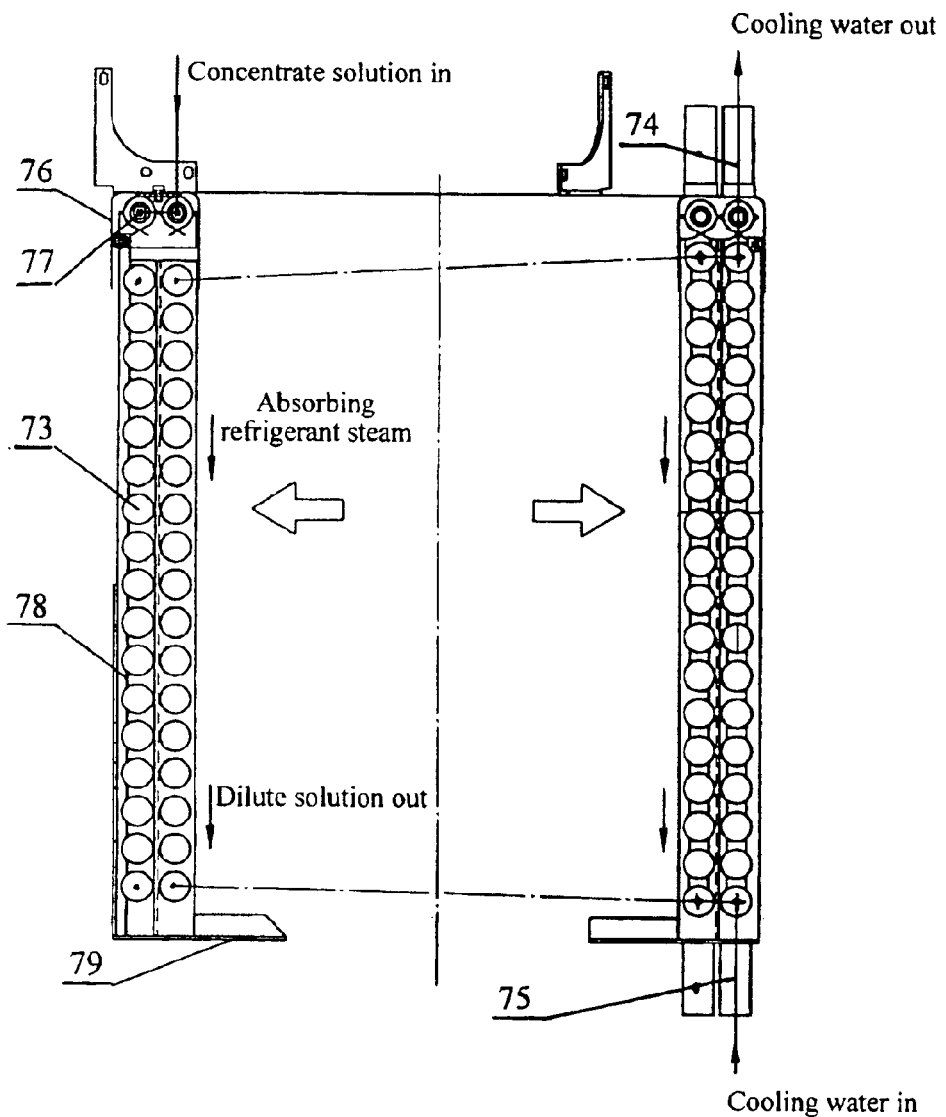
FIG. 17 is the I-I cross sectional view of FIG. 16.

EXAMPLE:

Referring now to FIGS. 1 and 4, the air conditioner core structure of the present invention is mainly composed of an upper vessel 24 and a lower vessel 21. The upper vessel 24 and lower vessel 21 are connected by refrigerant water pipe 22, cooling water pipe 7, heating steam pipe 5, two concentrate solution pipes 27, 58, and two dilute solution pipes 46, 52. The two concentrate solution pipes 27, 58 and the two dilute solution pipes 46, 52 are disposed within a solution pipe protecting cover 23, and the solution pipe protecting cover 23 connects to the upper vessel 24 and the lower vessel 21. The upper vessel 24 comprises a high temperature generator (HTG) 4, a low temperature generator (LTG) 2 and a condenser 1. The HTG 4 and LTG 2 are separated by separating plate I (35) and a separating plate II (33) of the HTG and LTG. Above the HTG 4 is the LTG 2, above the LTG 2 is the condenser 1. There are non-metal insulation boards 34 between the HTG 4 and the LTG 2, and between the LTG 2 and the condenser 1. The lower vessel 21 comprises plate heat exchanger 8, evaporator 10 and absorber 11. The plate heat exchanger 8 is located in the upper part of the lower vessel 24. The evaporator 10 and absorber 11 are below the plate heat exchanger 8. The evaporator 10 is at the middle part of the lower vessel 21, and the absorber 11 surrounds the evaporator 10. The heat exchange pipes 30, 39, 61, 73 of the condenser 1, LTG 2, evaporator 10 and absorber 11 are all helical copper pipes, see FIGS. 12 and 15.

Referring now to FIGS. 1, 2, 3, 4, 8, 14, 15 and 17, the condenser 1 comprises a condenser heat exchange pipe 30 and a condensation trough 38. The condenser heat exchange pipe 30 is located within the condensation trough 38. The cooling water outlet pipe 28 is connected to an outside cooling apparatus. The cooling water pipe 7 connects the cooling water inlet pipe 29 to the cooling water outlet pipe 74 of the absorber 11. The refrigerant water 25 of the condenser 1, through the refrigerant water outlet pipe 49 and the refrigerant water pipe 22, flows to the refrigerant water first time inlet pipe 64 of the evaporator 10.

Referring now to FIGS. 1, 4, 5, 6, 7 and 8, the LTG 2 comprises LTG steam inlet pipe 37, LTG front steam chamber 48, LTG tube sheet 42, LTG heat exchange pipe 39, LTG rear water chamber 43, LTG pressure differential capillary tube 31, LTG concentrate solution outlet chamber 44, LTG partition plate 45, concentrate solution outlet pipe 27 and dilute solution inlet pipe 46. One end of the LTG steam inlet pipe 37 is connected to the LTG front steam chamber 48, and the other end of the steam inlet pipe of the LTG is within the HTG steam chamber at the upper portion of the HTG. Under the inlet of the LTG steam inlet pipe 37 there is a HTG liquid guiding plate 41. Both ends of the LTG heat exchange pipe 39 are connected to the LTG tube sheet 42, and are further connected to the LTG front steam chamber (48) and the LTG rear water chamber (43), respectively. The LTG partition plate 45 separates the LTG concentrate solution outlet chamber 44 from the dilute solution inlet pipe 46. The LTG pressure differential capillary tube (31) connects the LTG rear water chamber (43) to the condenser 1. The concentrate solution outlet pipe 27 is connected to the LTG solution inlet pipe 81 of the absorber 11 through the plate heat exchanger 8. The dilute solution inlet pipe 46 is connected to the dilute solution pipe 82.

Referring now to FIGS. 1, 9, 10 and 11, the HTG 4 comprises a HTG combustion chamber 55, a HTG smoke pipe tube sheet 60, HTG smoke pipes 59, wavy fins 56, a HTG dilute solution inlet pipe 52, a HTG concentrate solution chamber 53, a HTG concentrate solution inlet pipe 58, a HTG concentrate solution outlet pipe 57, an equilibrium tube 51 and a HTG heating steam pipe 50. The bottom of the HTG 4 is has a cone shape, the HTG smoke pipe tube sheet 60 forms the HTG combustion chamber 55 and a rear sealing end on the left and the rear portion of the HTG, and further secures the HTG smoke pipes 59 at its front and rear portions. The wavy fins 56 are placed in a bundle of HTG smoke pipes 59. One end of the HTG dilute solution inlet pipe 52 is connected to the dilute solution outlet end of the plate heat exchanger 8, and the other end of the HTG dilute solution inlet pipe 52 is placed over the top of the HTG smoke pipes 59. The HTG concentrate solution chamber 53 is on the opposite side of the HTG combustion chamber 55, and the HTG concentrate solution inlet pipe 58 is located near the bottom of the HTG 4 so that the concentrate solution can enter the HTG concentrate solution chamber 53 from the bottom. The HTG concentrate solution outlet pipe 57 is connected to the HTG concentrate solution inlet pipe 80 of the absorber 11 through the plate heat exchanger 8. One end of the equilibrium tube 51 is connected to the HTG concentrate solution chamber 53, and the other end of the equilibrium tube 51 connects to the steam chamber of the HTG. The HTG heating steam pipe 50 connects the steam chamber of the HTG to a heating device.

Referring now to FIGS. 1, 12, 13 and 14, the evaporator 10 comprises a evaporator heat exchange pipe 61, refrigerant water spraying pipes 66, an outer liquid shielding plate 67, an inner water shielding plate 68, side liquid and water shielding plates 69, a water tray 71, a refrigerant water first time inlet pipe 64 and a refrigerant water second time inlet pipe 65. The refrigerant water second time inlet pipe 65 is connected to the refrigerant water spraying pipe 66, and refrigerant water 72 in the water tray 71 enters the refrigerant water second time inlet pipe 65 through the refrigerant water outlet pipe 83. The refrigerant water first time inlet pipe 64 is connected to the refrigerant water pipe 22 and the refrigerant water outlet pipe 49 of the condenser 1. The refrigerant water spraying pipes 66 of the refrigerant water first time inlet pipe 64 and the refrigerant water second time inlet pipe 65 are both above the evaporator heat exchange pipe 61. There is the inner water shielding plate 68 from the outer side of the refrigerant water spraying pipes 66 down to the evaporator heat exchange pipe 61, preferably to the top portion of the evaporator heat exchange pipe 61. Outside of the evaporator heat exchange pipe 61 there are the side liquid and water shielding plates 69; and outside the inner water shielding plate 68 there is the outer liquid shielding plate 67. The water tray 71 is located below the evaporator heat exchange pipe 61, with the edge of the water tray 71 being aligned with a middle portion of the side liquid and water shielding plates 69.

Referring now to FIGS. 1, 15, 16 and 17, the absorber 11 comprises an absorber heat exchange pipe 73, an absorber solution spraying pipe 77, a liquid shielding plate 76, a cooling water inlet pipe 75 and a cooling water outlet pipe 74. Above the absorber heat exchange pipe 73 is the absorber solution spraying pipe 77 which is connected to the LTG concentrate solution inlet pipe 81 and the HTG concentrate solution inlet pipe 80. The LTG concentrate solution inlet pipe 81 and the HTG concentrate solution inlet pipe 80 are connected to the concentrate solution outlet pipe of the plate heat exchanger 8. There is the liquid shielding plate 76 from the outer side of the absorber solution spraying pipe 77 down to the absorber heat exchange pipe 73, preferably to the top portion of the absorber heat exchange pipe 73. The cooling water inlet pipe 75 is connected to the outlet pipe of an outside cooling apparatus, and the cooling water pipe 7 connects the cooling water outlet pipe 74 to the cooling water inlet pipe 29 of the condenser 1.

Figure 14:
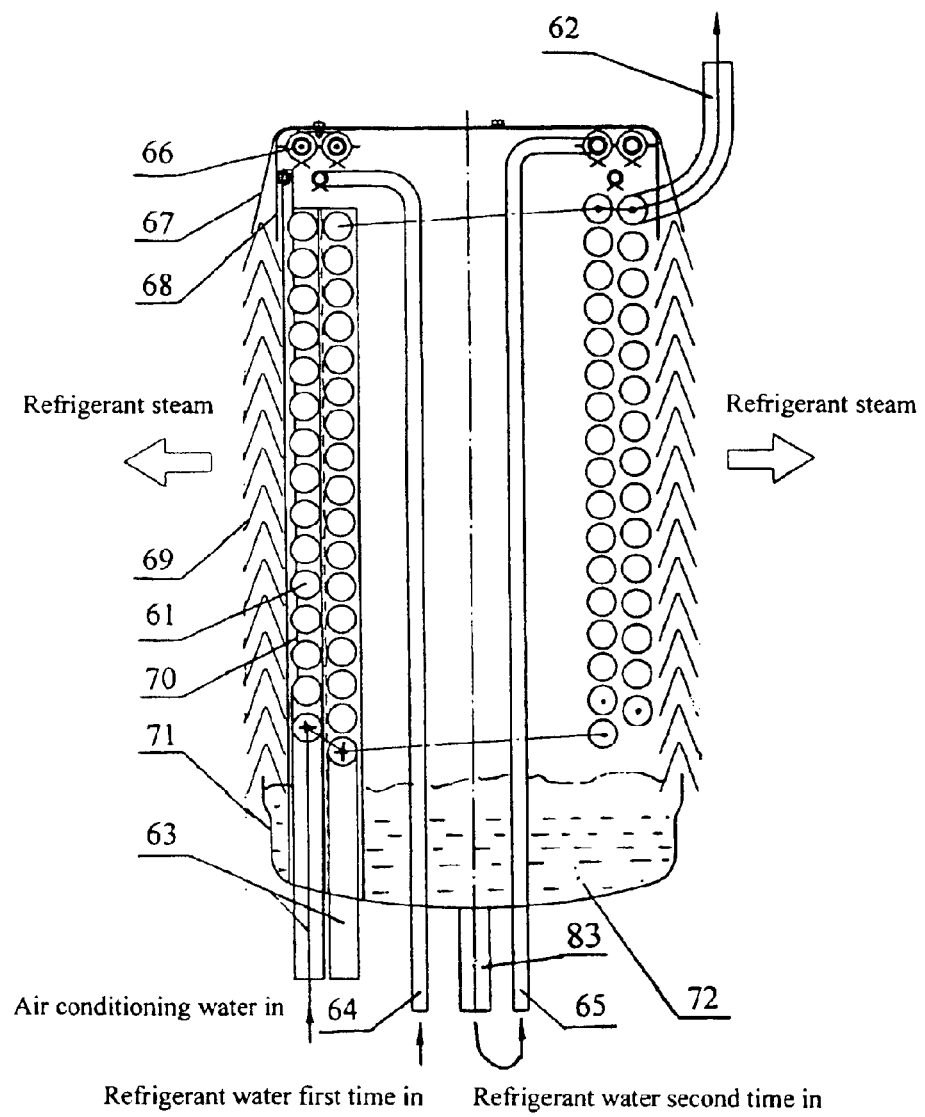
FIG. 14 is the H-H cross sectional view of FIG. 10.

The operating process of the present invention is as follows. Referring now to FIGS. 1, 8, 9, 10 and 11, when the heat resource in the HTG combustion chamber 55 of the HTG 4 burns and reaches 1200° C., the dilute solution from the plate heat exchanger 8 passing through the HTG dilute solution inlet pipe 52, is heated to 158° C. around the HTG smoke pipes 59 and the HTG combustion chamber 55. The dilute solution boils and produces a large amount of steam. To prevent the dilute solution from entering the LTG steam inlet pipe 37, the HTG liquid guiding plate 41 blocks the dilute solution from splashing in. At the same time, the smoke releases slowly from the HTG smoke pipes 59 through the wavy fins 56. After releasing a large amount of steam, 57% dilute solution is concentrated to 63% and sinks into the cone shape bottom of the HTG 4, then flows into the plate heat exchanger 8 through the HTG concentrate solution inlet pipe 58, to undergo the heat exchange process, and then flows into the absorber 11 and is sprayed out. Referring now to FIGS. 4 and 8, the large amount of steam produced by the HTG 4 enters the LTG heat exchange pipe 39 through the LTG steam inlet pipe 37, thereby it heats the dilute solution outside the pipe to 90° C. The LTG refrigerant steam produced from the dilute solution and the HTG refrigerant steam from the LTG pressure differential capillary tube 31 enter the condenser 1 and condense to water after the heat is released. 57% dilute solution in LTG is concentrated to 63%, then it once again enters the plate heat exchanger 8 through the concentrate solution outlet pipe 27 to undergo the heat exchange process, and enters the absorber 11 and is sprayed out. Referring now to FIGS. 1, 8, 14 and 17, the cooling water, which comes from the cooling water outlet pipe 74 of the absorber 11 to the cooling water inlet pipe 29 through the cooling water pipe 7, flows through the condenser heat exchange pipe 30, thereby condensing the steam outside the pipe into water; and the heat energy of the LTG 2 is carried away by the cooling water through the cooling water outlet pipe 28 into the cooling apparatus. As refrigerant, the condensed water, from the refrigerant water outlet pipe 49 through the refrigerant water pipe 22 and refrigerant water first time inlet pipe 64, enters the evaporator 10, hence provides cooling by evaporation. Referring now to FIGS. 1 and 14, the 14° C. air conditioning water from the air conditioning system, through the air conditioning water inlet pipe 63, enters the evaporator heat exchange pipe 61. The 4° C. refrigerant water of the condenser 1 through the refrigerant water first time inlet pipe 64, and the refrigerant water 72 of the water tray 71 through the refrigerant water second time inlet pipe 65 spray towards the evaporator heat exchange pipe 61. The temperature of the air conditioning water within the evaporator heat exchange pipe 61 reduces to 7° C. by evaporation of refrigerant water outside of the evaporator heat exchange pipe 61; then it, through the air conditioning water outlet pipe 62, enters the air conditioning heat exchange pipe which has an external air fan. The refrigerant water receives the heat energy of the air conditioner system and then changes to steam that is absorbed by the absorber 11. Referring now to the FIGS. 1 and 17, the lithium bromide solution, which has a concentration of 63% and a temperature of 37° C., has a very strong capacity of absorbing water steam. The concentrate solution from the plate heat exchanger 8 sprays through the absorber solution spraying pipe 77 towards the absorber heat exchange pipe 73. When the concentrate solution absorbs the steam from the evaporator 10, its temperature raises, and its concentration reduces. The absorbed heat of the concentrate solution is carried away by the cooling water that enters absorber heat exchange pipe 73 through the cooling water inlet pipe 75. While the concentrate solution becomes dilute to 57%, and it is pumped by the solution pump 19 to the plate heat exchanger 8, in there this solution involves in the heat exchange process. This solution is then sent to the HTG 4 and the LTG 2, respectively, to be heated and condensed. The above-described process is repeated continuously to maintain the normal operation of the air conditioner.

The advantages of the present invention are as follows:

1. It is a breakthrough of the structure of the traditional absorption-type air conditioner. The condenser 1, LTG 2 and HTG 4 are in one vessel. Above the HTG 4 is the LTG 2, and above the LTG 2 is condenser 1. This structure substantially reduces outward leakage. The upper vessel 24 has only one long welding seam, therefore it has a superior vacuum condition and a compact structure. There is a proper heat exchange gradient between the HTG and the LTG. The temperature in the HTG 4 is the highest, the temperature in the LTG 2 is in the middle, and the temperature in the condenser 1 is the lowest. The heat exchange pipes of the condenser 1, LTG 2, evaporator 10 and absorber 11 are all helical copper pipes, which has high heat exchange efficiency.

2. In the upper vessel 24 there are non-metal insulation boards 34 between the HTG 4 and the LTG 2, and between the LTG 2 and the condenser 1.

3. When the steam of the LTG 2 enters the condenser 1 and then condenses into water the pressure difference is very large. The present invention utilizes a very long helical LTG pressure differential capillary tube 31 to increase the resistance for entering the condenser, and adjust the pressure between the LTG 2 and the condenser 1.

4. The structural arrangement for the concentrate solution exiting the HTG 4 and the dilute solution entering the HTG 4, and the dilute solution exiting the LTG 2 and the concentrate solution entering the LTG 2, has the solutions entering and existing at high positions, therefore maintains very stable solution level. This ensures that the HTG smoke pipes 59 and the upper vessel 24 are not burned out, and prevents the solution from being either over concentrate or over dilute. Furthermore, it ensures every HTG smoke pipes 59 having sufficient heat exchange.

5. The HTG 4 has an eccentrical HTG combustion chamber, and a rear sealing end that can release the smoke through the HTG smoke pipes 59. The bottom of the HTG 4 has a cone-shape similar to the bottom of a pan, which can effectively separate the concentrate solution from the dilute solution. The concentrate solution can be retrieved from the bottom of the pan, and the equilibrium tube 51 can release the gas in the concentrate solution into the steam chamber of the HTG. Furthermore, the HTG liquid guiding plate 41 can prevent the boiling solution from splashing into the LTG steam inlet pipe 37.

6. The evaporator 10 and the absorber 11 has the inner water shielding plate 68 and the liquid shielding plate 76, respectively. The evaporator 10 further has the outer liquid shielding plate 67. With these covers, the refrigerant water cannot spray to the outside, at the same time, the solution from the outside can not come in. Furthermore, between the evaporator 10 and the absorber 11 there is the side liquid and water shielding plate 69. The solution of the absorber 11 also cannot enter the evaporator 10. Therefore, the solution does not contaminate the refrigerant water, and the refrigerating operation of the system can be assured.

7. The plate heat exchanger 8 is located within the lower vessel 21. All four solution pipes of the absorber 11, for the concentrate solution in and the dilute solution out, are within the lower vessel 21. Even if there is a small amount of leakage, it will not influence vacuum level of the whole system. At the same time, the four solution pipes between the upper vessel 24 and the lower vessel 21 are all surrounded by the solution pipe protecting cover 23. The solution pipe protecting cover 23 can be welded conveniently.

8. The upper vessel 24, lower vessel 21 and solution pipe protecting cover 23 have few welding seams, which can meet the requirement of the high level vacuum.

Because of its compact structure, small volume, few welding seams, high level vacuum, and having the heat exchange pipes (30, 39, 61, 73) of the condenser 1, LTG 2, evaporator 10 and absorber 11 all made of helical copper pipes, the air conditioner core structure of the present invention has high heat exchange efficiency.

I claim:

1. An absorption-type air conditioner core structure characterized in that the absorption-type air conditioner core structure comprises an upper vessel (24) and a lower vessel (21), the upper vessel (24) and lower vessel (21) being connected by a refrigerant water pipe (22), a cooling water pipe (7) and a heating steam pipe (5), two concentrate solution pipes (27, 58) and two dilute solution pipes (46, 52); wherein the two concentrate solution pipes (27, 58) and the two dilute solution pipes (46, 52) are disposed within a solution pipe protecting cover (23), and the solution pipe protecting cover (23) connects to the upper vessel (24) and the lower vessel (21); and wherein the upper vessel (24) comprises a high temperature generator (HTG)(4), a low temperature generator (LTG)(2) and a condenser (1), the HTG (4) and the LTG (2) being separated by a separating plate I (35) and a separating plate II (33) of the HTG and LTG; above the HTG (4) is the LTG (2), and above the LTG (2) is the condenser (1); there are non-metal insulation boards (34) between the HTG (4) and the LTG (2), and between the LTG (2) and the condenser (1); and wherein the lower vessel (21) comprises a plate heat exchanger (8), an evaporator (10) and an absorber (11); the plate heat exchanger (8) is located in an upper part of the lower vessel (24); the evaporator (10) and absorber (11) are below the plate heat exchanger (8); the evaporator (10) is at a middle part of the lower vessel (21), and the absorber (11) surrounds the evaporator (10).

2. The absorption-type air conditioner core structure according to claim 1 characterized in that the condenser (1) comprises the condenser heat exchange pipe (30) and a condensation trough (38); the condenser heat exchange pipe (30) is located within the condensation trough (38); a cooling water outlet pipe (28) is connected to an outside cooling apparatus; and a cooling water inlet pipe (29) connects with a cooling water pipe (7) and a cooling water outlet pipe (74) of the absorber (11); and a refrigerant water (25) of the condenser (1) flows to a refrigerant water first time inlet pipe of the evaporator (10) through a refrigerant water outlet pipe (49) and a refrigerant water pipe (22).

3. The absorption-type air conditioner core structure according to claim 1 characterized in that the LTG (2) comprises a LTG steam inlet pipe (37), a LTG front steam chamber (48), a LTG tube sheet (42), LTG heat exchange pipes (39), a LTG rear water chamber (43), a LTG pressure differential capillary tube (31), a LTG concentrate solution outlet chamber (44), a LTG partition plate (45), the concentrate solution outlet pipe (27) and the dilute solution inlet pipe (46); one end of the LTG steam inlet pipe (37) is connected to the LTG front steam chamber (48), and an other end thereof is inside a HGT steam chamber at an upper part of the HTG; under an inlet of the LTG steam inlet pipe (37) there is a HTG liquid guiding plate (41); both ends of the LTG heat exchange pipe (39) are connected to the LTG tube sheet (42), and are further connected to the LTG front steam chamber (48) and the LTG rear water chamber (43), respectively; the LTG partition plate (45) separates the LTG concentrate solution outlet chamber (44) from the dilute solution inlet pipe (46); the LTG pressure differential capillary tube (31) connects the LTG rear water chamber (43) to the condenser (1); the concentrate solution outlet pipe (27) is connected to the LTG solution inlet pipe (81) of the absorber (11) through the plate heat exchanger (8); and the dilute solution inlet pipe (46) is connected to the dilute solution pipe (82).

4. The absorption-type air conditioner core structure according to claim 1 characterized in that the HTG (4) comprises a HTG combustion chamber (55), a HTG smoke pipe tube sheet (60), HTG smoke pipes (59), wavy fins (56), the HTG dilute solution inlet pipe (52), a HTG concentrate solution chamber (53), the HTG concentrate solution inlet pipe (58), a HTG concentrate solution outlet pipe (57), an equilibrium tube (51) and a HTG heating steam pipe (50); wherein a bottom of the HTG (4) has a cone shape; the HTG smoke pipe tube sheet (60) forms the HTG combustion chamber (55) and a rear sealing end at a left and a rear portion of the HTG, and further secures the HTG smoke pipes (59) at a front and a rear ends thereof; the wavy fins (56) are placed in a bundle of HTG smoke pipes (59); one end of the HTG dilute solution inlet pipe (52) is connected to the dilute solution outlet of the plate heat exchanger (8), and an other end of the HTG dilute solution inlet pipe (52) 52 is placed over a top of the HTG smoke pipes (59); the HTG concentrate solution chamber (53) is on an opposite side of the HTG combustion chamber (55); and the HTG concentrate solution inlet pipe (58) is located near the bottom of the HTG (4) so that the concentrate solution enters the HTG concentrate solution chamber (53) from the bottom; HTG concentrate solution outlet pipe (57) is connected to the HTG concentrate solution inlet pipe (80) of the absorber (11) through the plate heat exchanger (8); one end of the equilibrium tube (51) is connected to the HTG concentrate solution chamber (53), and an other end of the equilibrium tube (51) connects to a HTG steam chamber; and the HTG heating steam pipe (50) connects the HTG steam chamber to a heating device.

5. The absorption-type air conditioner core structure according to claim 1 characterized in that the evaporator (10) comprises an evaporator heat exchange pipe (61), refrigerant water spraying pipes (66), an outer liquid shielding plate (67), an inner water shielding plate (68), side liquid and water shielding plates (69), a water tray (71), a refrigerant water first time inlet pipe (64) and a refrigerant water second time inlet pipe (65); wherein the refrigerant water second time inlet pipe (65) is connected to the refrigerant water spraying pipe (66), and a refrigerant water (72) in the water tray (71) enters the refrigerant water second time inlet pipe (65) through a refrigerant water outlet pipe (83); the refrigerant water pipe (22) connects the refrigerant water first time inlet pipe (64) to the refrigerant water outlet pipe (49) of the condenser (1); and the refrigerant water spraying pipes (66) of the refrigerant water first time inlet pipe (64) and the refrigerant water second time inlet pipe (65) are both above the evaporator heat exchange pipe (61); there is the inner water shielding plate (68) from an outer side of the refrigerant water spraying pipe (66) down to a top portion of the evaporator heat exchange pipe (61); outside the evaporator heat exchange pipe (61) there are the side liquid and water shielding plates (69), and outside the inner water shielding plate (68) there is the outer liquid shielding plate (67); the water tray (71) is located below the evaporator heat exchange pipe (61), with the edge of the water tray (71) being aligned with a middle portion of the side liquid and water shielding plates (69).

6. The absorption-type air conditioner core structure according to claim 1 characterized in that the absorber (11) comprises the absorber heat exchange pipe (73), absorber solution spraying pipe (77), liquid shielding plate (76), cooling water inlet pipe (75) and cooling water outlet pipe (74); wherein the absorber solution spraying pipe (77) is above the absorber heat exchange pipe (73); the absorber solution spraying pipe (77) is connected to the LTG solution inlet pipe (81) and the HTG concentrate solution inlet pipe (80); and the LTG solution inlet pipe (81) and the HTG concentrate solution inlet pipe (80) are connected to the two concentrate solution outlet pipes of the plate heat exchanger (8); there is the liquid shielding plate (76) from an outer side of the absorber solution spraying pipes (77) down to a top portion of the absorber heat exchange pipe (73); the cooling water inlet pipe (75) is connected to an outlet pipe of an outside cooling apparatus; and the cooling water outlet pipe (74) is connected to the cooling water pipe (7) and the cooling water inlet pipe (29) of the condenser (1).

7. The absorption-type air conditioner core structure according to claim 1 characterized in that heat exchange pipes (30, 39, 61, 73) of the condenser (1), LTG (2) the evaporator (10) and the absorber (11) are all helical copper pipes.

* * * * *